US010960358B2

(12) United States Patent
Roesink et al.

(10) Patent No.: US 10,960,358 B2
(45) Date of Patent: Mar. 30, 2021

(54) METHOD FOR THE PRODUCTION OF POSITIVELY CHARGED MEMBRANES

(71) Applicant: NX Filtration Holding B.V., Enschede (NL)

(72) Inventors: Hendrik Dirk Willem Roesink, Hertme (NL); Joris De Grooth, Enschede (NL)

(73) Assignee: NX Filtration Holding B.V., Enschede (NL)

( * ) Notice: Subject to any disclaimer, the term of this patent is extended or adjusted under 35 U.S.C. 154(b) by 114 days.

(21) Appl. No.: 16/325,683

(22) PCT Filed: Aug. 18, 2016

(86) PCT No.: PCT/NL2016/050584
§ 371 (c)(1),
(2) Date: Feb. 14, 2019

(87) PCT Pub. No.: WO2018/034560
PCT Pub. Date: Feb. 22, 2018

(65) Prior Publication Data
US 2019/0201852 A1     Jul. 4, 2019

(51) Int. Cl.
*B01D 67/00*     (2006.01)
*B01D 71/68*     (2006.01)
(Continued)

(52) U.S. Cl.
CPC ...... *B01D 67/0011* (2013.01); *B01D 67/0013* (2013.01); *B01D 69/02* (2013.01);
(Continued)

(58) Field of Classification Search
CPC .... B01D 67/0093; B01D 71/52; B01D 71/68; B01D 61/027; B01D 67/0006; B01D 69/02; B01D 69/10; B01D 69/125; B01D 2325/16; B01J 20/18; C07F 7/0838; C08F 8/30
See application file for complete search history.

(56) References Cited

U.S. PATENT DOCUMENTS 4,761,233 A *   8/1988   Linder ............... B01D 67/0011
                                                                                     210/500.37
4,839,203 A *   6/1989   Davis ................. B01D 67/0088
                                                                                     210/500.27
(Continued)

FOREIGN PATENT DOCUMENTS

WO     WO2013116408 A1     8/2013

OTHER PUBLICATIONS

ChemSpider, Croyal Society of Chemistry, http://www.chemspider.com/Chemical-structure.29080.html, Jul. 28, 2020. Sulfolane structure and name.*

(Continued)

*Primary Examiner* — Ana M Fortuna
(74) *Attorney, Agent, or Firm* — Michael J. Blessent; Bret E. Field; . Bozicevic, Field & Francis LLP (57) ABSTRACT

The present invention relates to a method for the production of a positively charged membrane. Furthermore the present invention relates to a positively charged membrane obtainable by the methods of present invention and the use of these positively charged membranes.

21 Claims, 4 Drawing Sheets

(51) Int. Cl.
*B01D 69/14* (2006.01)
*B01D 69/02* (2006.01)
*B01D 69/06* (2006.01)
*B01D 69/08* (2006.01)
*B01D 71/60* (2006.01)

(52) U.S. Cl.
CPC .......... *B01D 69/06* (2013.01); *B01D 69/087* (2013.01); *B01D 69/141* (2013.01); *B01D 71/68* (2013.01); *B01D 71/60* (2013.01); *B01D 2325/16* (2013.01)

(56) References Cited

U.S. PATENT DOCUMENTS

| | | | |
|---|---|---|---|
| 5,531,893 | A | 7/1996 | Hu et al. |
| 6,759,441 | B1 | 7/2004 | Kerres et al. |
| 2003/0121857 | A1* | 7/2003 | Kurth ................ B01D 71/66 210/651 |
| 2015/0068978 | A1* | 3/2015 | Lando ................ B01D 71/12 210/636 |
| 2016/0136589 | A1* | 5/2016 | Misner ............... B01D 71/76 210/321.84 |
| 2016/0214068 | A1* | 7/2016 | Weber ................ B01D 69/08 |
| 2019/0201852 | A1* | 7/2019 | Roesink ............. B01D 67/0013 |

OTHER PUBLICATIONS

Zhu et al., Fabrication of a Mixed Matrix Membrane with in Situ Synthesized Quaternized Polyethylenimine Nanoparticles for Dye Purification and Reuse, ACS Sustainable Chem. Eng., 2015, 3 (4), pp. 690-701.

Yu et al., Preparation and characterization of HPEI-GO/PES ultrafiltration membrane with antifouling and antibacterial properties, Journal of Membrane Science, vol. 447, Nov. 15, 2013, pp. 452-462.

* cited by examiner

METHOD FOR THE PRODUCTION OF POSITIVELY CHARGED MEMBRANES

The present invention relates to a method for the production of a positively charged membrane. Furthermore the present invention relates to a positively charged membrane obtainable by the methods of present invention and the use of these positively charged membranes.

Membranes can be produced as hollow fiber membranes or as flat sheet membranes. Hollow fiber or capillary membranes are bundled and potted/glued in a cylindrical membrane module. There are various polymers of which membranes can be produced. The most common polymers in membrane synthesis are cellulose acetate, nitrocellulose, cellulose esters, polysulfone, polyethersulfone, polyacrilonitrile, polyamide, polyimide, polyethylene, polypropylene, polytetrafluoroethylene, polyvinylidene fluoride and polyvinylchloride. Many membrane polymers are custom-modified to improve their functional properties: selectivity, hydrophilicity, non-binding, etc. The degree of selectivity of a membrane depends on the membrane pore size, and properties of the membrane material such as surface charge, hydrophilicity, hydrophobicity, etc. Depending on the pore size, they can be classified as microfiltration, ultrafiltration, nanofiltration, or reverse osmosis membranes. Depending on the type of membrane they can be of various thickness, with a homogeneous or heterogeneous structure, hydrophilic or hydrophobic and the membranes can be neutral, positively or negatively charged.

Polymer membranes generally may be formed from the melt of a thermoplastic polymer, e.g. by extrusion, or from a polymer solution in a coagulation process. The polymers are dissolved in a suitable solvent, e.g. N-methyl-2-pyrrolidone, di-methyl-acetamide, di-methyl-sulfoxide, etc., together with additive(s), and mixed until a viscous solution is obtained. Depending on the type of polymer(s) in the solution, the temperature during mixing can be increased up to 350° C. to obtain a viscous solution. In the coagulation process the membranes are formed by phase separation of the polymer solution. Phase separation can be induced by cooling said mixture or exposing the mixture to a non-solvent. The former method is called thermally induced phase separation (TIPS), while the latter method is known as non-solvent induced phase separation (NIPS). TIPS always results in fibers with isotropic, symmetric membrane structures, whereas with NIPS a wide variety of membrane structures can be produced. Typical membrane structures produced via NIPS are asymmetric sponge-like, symmetric sponge-like, finger-like or macrovoid like structures. This ability to tune the membrane structure with NIPS is advantageous as it allows customization and optimization for a wide range of applications. In NIPS, the polymer solution is immersed in a non-solvent bath (coagulation bath), where the exchange of solvent and non-solvent takes place. A porous polymeric membrane is formed under controlled conditions in the coagulation bath. The solvent migrates from the polymer solution into the coagulation bath, while the non-solvent follows the reverse path, leading finally to the formation of the membrane. Most often, the coagulant is water or an aqueous solution wherein the membrane matrix forming polymer does not dissolve.

By blending different polymers, various membrane properties can be obtained that are not obtained with "single polymer solutions". The properties of membranes that consist of blended polymers depend on several variables such as the ratio between the polymers and the interaction between the components in the blend. Also various additives can be added to the mixture to obtain additional characteristics of the membrane or to achieve a more efficient production process. Chemical additives can be used to alter the properties of the membranes, e.g. change the hydrophilicity, reduce the fouling rate during filtration, increase the chemical stability, increase the mechanical strength or act as so-called pore-forming agents.

Polyvinylpyrrolidone (PVP) is a well-known example of an additive used in the production of membrane as a hydrophilicity improver and as a pore-forming agent. The use of many additives in the production of membrane, such as pore-forming agents, is often undesirable because the additive must be removed from the produced membrane. These additives can be referred to as "fugitive additives" that require an additional, costly, removal step downstream of the membrane production process.

A polymer mixture that is often used for the production of membranes is polyethersulfone (PES) mixed with PVP in a standard organic solvent such as N-methyl-2-pyrrolidone (NMP). In this way, hydrophilic membranes are obtained that are negatively charged.

In order to produce a positively charged membrane, positively charged polymers (polycations) can be used as functional polymers. These polycations have electrolyte groups that dissociate in aqueous solutions, making the polymers charged. Positively charged membranes are hitherto produced via a multiple steps procedure. For instance, a positive layer is applied during the production of the membrane or by an additional extensive post-treatment of the produced membrane by coating or chemical grafting procedures. In this way only the top layer of the membrane is positively charged. A downside of coating of a membrane is that the coating negatively affects the pore size of the membrane. Another downside is that the coating will dissolve over time, reducing the efficacy of the membrane. Furthermore, the production of positive membranes requires a post treatment process which makes the production of these membranes expensive.

A challenge of the blending of polymers is that many polymers are incompatible and do not mix, this makes it difficult to form membranes with a proper structure in term of homogenous, thickness, pore size, etc. The mixing/blending of polymers to produce positively charged membranes in a one step process has not been done before. The blending of polymers has an advantage over coating: It is a one step process, while the coating of membranes needs at least one additional step if not multiple additional steps to produce a coated membrane.

Up to now it has not been succeeded to produce positively charged membranes by the known methods as described above, mixing an engineering plastic with a second polymer in the dope. The reason for this is that the positively charged polymers, such as polyethylenimine (PEI), are not soluble in NMP. Therefore, no clear and stable dope can be produced which in turn can be used to produce the positive charges membranes.

Considering the above, there is a need in the art for a method to produce durable positively charged membranes in a single step procedure, without negatively affecting the pore size of the membrane.

It is an objective of the present invention, amongst other objects, to address the above need in the art. The object of present invention, amongst other objects, is met by the present invention as outlined in the appended claims.

Specifically, the above object, amongst other objects, is met, according to a first aspect, by the present invention by a method for the production of a positively charged membrane, comprising the following steps
    a) mixing at least an aprotic solvent, a polyarylether, 2,3,4,5-tetrahydrothiophene-1,1-dioxide and a polycation;
    b) heating of the mixture above the critical mixing temperature of the polyarylether to obtain a clear and homogenous mixture;
    c) let the mixture cool down to below said critical mixing temperature, preferable to room temperature;
    d) followed by non-solvent induced phase separation resulting in the formation of the positively charged membranes.

An often used standard organic solvent used in the production of membranes is N-methyl-2-pyrrolidone (NMP). NMP is miscible with water and with most common organic solvents. However polycations are not soluble in NMP and no clear and stable dope can be produced which in turn can be used to produce the positive charges membranes. In the method of present invention the organic solvent used is 2,3,4,5-tetrahydrothiophene-1,1-dioxide (also known as sulfolane or tetramethylene sulfone). 2,3,4,5-tetrahydrothiophene-1,1-dioxide is a polar solvent, readily soluble in water. But more importantly, in contrast to the generally used NMP, 2,3,4,5-tetrahydrothiophene-1,1-dioxide is able to dissolve polycations, such as PEI.

Polyarylethers, such as PES, typically only dissolve in 2,3,4,5-tetrahydrothiophene-1,1-dioxide at very high temperatures (>130° C.). This temperature is an excessively high temperature (critical mixing temperature) in order to make the positively charged membranes of present invention via NIPS, negatively affecting the pore size, structure and porosity characteristics of the membranes of present invention. Therefore 2,3,4,5-tetrahydrothiophene-1,1-dioxide is mixed with small quantities of an aprotic solvent, preferably NMP. By mixing the aprotic solvent with 2,3,4,5-tetrahydrothiophene-1,1-dioxide the dissolution temperature of the polyarylether is strongly reduced, depending on the ratio aprotic solvent to 2,3,4,5-tetrahydrothiophene-1,1-dioxide. Furthermore the mixture comprising polyarylether, aprotic solvent and 2,3,4,5-tetrahydrothiophene-1,1-dioxide is able to dissolve the polycation used to produce a positively charged membrane.

The initial mixing of at least an aprotic solvent, a polyarylether, 2,3,4,5-tetrahydrothiophene-1,1-dioxide and a polycation is performed at room temperature followed by heating the mixture above the critical mixing temperature of the polyarylether to obtain a clear and homogenous viscous mixture. Obtaining a clear mixture is of importance for obtaining a high quality of the membranes. The obtained homogenous mixture will remain clear and stable at room temperature (e.g. 18 to 25° C.). The higher the percentage of 2,3,4,5-tetrahydrothiophene-1,1-dioxide in the mixture, the higher the temperature needed to obtain a clear and homogenous mixture that remains stable at room temperature.

There is a direct relationship between the miscibility of the polycation (e.g. PEI) and the percentage of 2,3,4,5-tetrahydrothiophene-1,1-dioxide that is present in the mixture. To dissolve more of the polycation in the mixture, a higher concentration of 2,3,4,5-tetrahydrothiophene-1,1-dioxide is needed for a sponge structure in the membrane being produced. However, by increasing the percentage of 2,3,4,5-tetrahydrothiophene-1,1-dioxide in mixture the critical mixing temperature also rises up to a point that is too high for the production of membranes via NIPS. Therefore, critical balance exists between 2,3,4,5-tetrahydrothiophene-1,1-dioxide and the polycation to be used in the mixture to produce the membrane.

Surprisingly, with a mixture of an aprotic solvent, a polyarylether, 2,3,4,5-tetrahydrothiophene-1,1-dioxide and a polycation, positively charged membranes can be produced with the desired sponge structure, without the use of further pore forming additives such as PVP. The use of additives is undesirable because the additive must be removed from the produced membrane afterwards in an additional removal process.

According to a preferred embodiment, the present invention relates to the method for the production of a positively charged membrane, wherein 2,3,4,5-tetrahydrothiophene-1,1-dioxide is present in the homogenous mixture from 50% to 80%, preferably from 55% to 70%, more preferably from 60% to 65%, based on the total weight of the mixture.

According to another preferred embodiment, the present invention relates to the method for the production of a positively charged membrane, wherein the polyarylether is present in the homogenous mixture from 10% to 30%, preferably from 15% to 25%, most preferably 17% to 21%, based on the total weight of the mixture. Polyarylethers are an important class of commercial polymers and are a member of the family of materials referred to as engineering thermoplastics. Polyarylethers have extensive industrial applications because of their properties, such as heat resistance, radiation resistance, impact resistance, and chemical resistance. Examples of polyarylethers that can be used are polyethersulfone (PES), sulfonated polyethersulfone (SPES), polyaryletherketone (PEEK), polyether-ketone-ketone (PEKK), polyarylethersulfone (PAES), polyphenylsulfone (PPSU), polysulfone (PSU) and polyphenylene oxide (PPO).

According to yet another preferred embodiment, the present invention relates to the method for the production of a positively charged membrane, wherein the polyarylether is polyethersulfone or sulfonated polyethersulfone or a mixture thereof. SPES has similar properties to PES. SPES is modified PES wherein the sulfone groups are orthogonally disposed to the ether group on the aryl groups, giving the polymer a higher degree of interaction with water in contrast to PES. Like PES, SPES has an amorphous polymer structure. These additional sulfonate groups also give more opportunity to interact with positively charged polymers which is advantageous for the blending of polymers.

The degree of sulfonation of SPES, the percentage of the repeating units that are sulfonated in PES, may vary between 1% and 25%. However, a practical problem is that usually with a higher degree of sulfonation the stability of the SPES deteriorates, the water solubility increases and the molecular weight of the polymer decreases. Also SPES with a high degree (>10%) of sulfonation is not readily available. Mostly, SPES is used containing 5% sulfonated groups.

According to a preferred embodiment, the present invention relates to the method for the production of a positively charged membrane, wherein the aprotic solvent is present in the homogenous mixture from 1% to 50%, preferably from 5% to 30%, most preferably from 10% to 20%, based on the total weight of the mixture.

According to another preferred embodiment, the present invention relates to the method for the production of a positively charged membrane, wherein the aprotic solvent is selected from the group consisting of N-methyl-2-pyrrolidone, tetrahydrofuran, ethyl acetate, acetone, dimethylformamide, acetonitrile and dimethyl sulfoxide, preferably N-methyl-2-pyrrolidone.

According to yet another preferred embodiment, the present invention relates to the method for the production of a positively charged membrane, wherein the polycation is present in the homogeneous mixture from 0.1% to 10%, preferably from 0.2% to 5%, most preferably from 0.3% to 1.8%, based on the total weight of the mixture.

Using SPES instead of PES in the method of present invention has the advantage that a higher concentration of polycation can be added to the mixture, without resulting in demixing. The additional sulfone groups interact with the polycation to obtain an optimal polymer mixture. When the polyarylether in the mixture according to the method of present invention is PES, the polycation is present in the mixture from 0.1% to 2.0%, preferably from 0.2% to 1.5%, most preferably from 0.3% to 0.6%. When the polyarylether in the mixture according to the method of present invention is SPES, the polycation is present in the mixture from 0.1% to 5.0%, preferably from 0.5% to 3.0%, most preferably from 0.8% to 1.6%, based on the total weight of the mixture.

According to a preferred embodiment, the present invention relates to the method for the production of a positively charged membrane, wherein the polycation comprises amine groups and the polycation is preferably selected from the group consisting of, polyethylenimine, polyallylamine and polydiallyldimethylammonium, most preferably polyethylenimine.

According to a second aspect, present invention relates to a positively charged membrane obtainable by the method of present invention, comprising a polyarylether and a polycation.

According to a preferred embodiment, the present invention relates to the positively charged membrane, wherein the polycation is homogenously distributed in the membrane. In contrast to the known positively charged membranes that have a thin layer of positively charged coating/layer, the positively charged polycation is homogenously distributed throughout the membrane and within the polymer matrix of present invention.

According to another preferred embodiment, the present invention relates to the positively charged membrane, wherein the membrane is comprised of at least 0.4% of the polycation, based on the total weight of the membrane.

According to yet another preferred embodiment, the present invention relates to the positively charged membrane, wherein the membrane is comprised of at least 50% of the polyarylether, based on the total weight of the membrane.

According to another preferred embodiment, the present invention relates to the positively charged membrane, wherein the polyarylether is PES or SPES or a mixture thereof.

According to a preferred embodiment, the present invention relates to the positively charged membrane, wherein the polycation is preferably selected from the group consisting of, polyethylenimine, polyallylamine and polydiallyldimethylammonium, most preferably polyethylenimine.

According to yet another preferred embodiment, the present invention relates to the positively charged membrane, wherein the membrane is positively charged at a pH less then pH 8, preferably less then pH 9, most preferably less then pH 10. Membrane surface charge is quantified by zeta potential measurements. The pH has an effect upon the charge of a membrane due to the disassociation of functional groups. At low pH, there is a high proton concentration in the solution leading to the protonation of the functional groups, resulting in a positive charged membrane. On the other hand at high pH, due to a low proton concentration in the solution, this leads to the de-protonation of functional groups resulting in a negatively charged membrane. Therefore, zeta potentials for most membranes become increasingly more negative as pH is increased and functional groups are deprotonated. The membrane is positively charged, dependent on the polycation being used in the mixture and the pH. The charge does depend on the pH and in this case a positively charged membrane depends upon the pKa of the membrane. At a pH equal to the pKa the transition occurs from a positively charged membrane to a negatively charged membrane. With a pH below the pKa of the membrane (depending on the type of polycation), the membrane is positively charged. For most of the primary ($NH_2R$) and secondary amines ($NHR_2$) used in membranes, this transition point is around pH of 9 to 10. Strong polycations have a positive charge over the entire pH range. Usually these polycations are quaternary amines with the formula $NR_4^+$.

According to a preferred embodiment, the present invention relates to the positively charged membrane with a pore size of 10 nm to 80 nm, preferably 15 nm to 50 nm, most preferably 20 nm to 30 nm. To achieve a high degree of absorption of the membrane a homogenous sponge-like structure is desired, and macrovoids should be avoided. The membranes should have a dense structure with open sponge-like pores, without any macrovoids that can adversely affect the membrane properties. Such dense structures increase the contact area between the membrane and the contaminants in the liquid and increase the adsorption and disinfection rate. With the positively charged membrane this creates a large surface area where the negatively charged particles come into contact with a polycation.

According to a third aspect, present invention relates to the use of the positively charged membrane of present invention for decontaminating liquids.

According to a preferred embodiment, the present invention relates to the use of the positively charged membrane of present invention, wherein decontamination comprises the removal and/or inactivation of microorganisms, preferably viruses. The positively charged membranes of present invention can be used as a base for the hollow fiber (layer-by-layer) nanofiltration. Another application for these types of positive membranes is that they can be used for filtration and/or deactivation of biological substances that are negatively charged. For instance the porous positively charged membrane filter can be used to filtrate and deactivate pathogens, such as viruses, bacteria or other microbes that have a negative surface potential. Porous positively charged membranes have great potential in the biomedical and pharmaceutical industry. In addition to viruses, other microorganism According to a fourth aspect, present invention relates to a filter device comprising at least one positively charged membrane of present invention.

The present invention will be further detailed in the following examples and figures wherein.

EXAMPLE 1

Producing Flat Sheet Positively Charged Membranes of Present Invention with PES.

Figure 1:
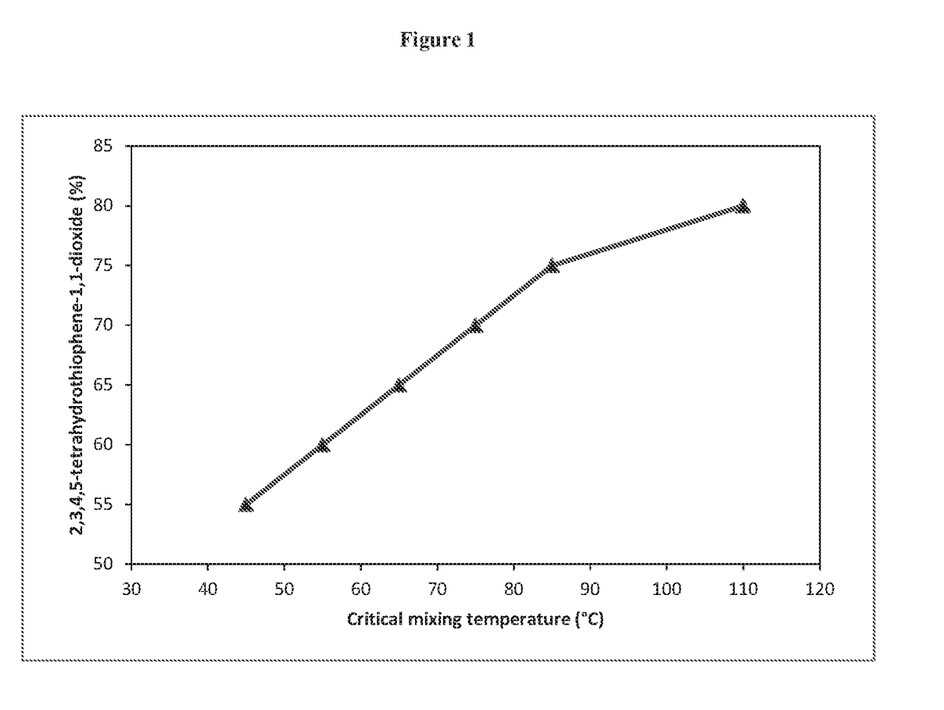
FIG. 1: shows the relation between the critical mixing temperature (° C.) and the percentage of PES that can be dissolved in 2,3,4,5-tetrahydrothiophene-1,1-dioxide. By increasing the percentage of 2,3,4,5-tetrahydrothiophene-1,1-dioxide in the mixture the critical mixing temperature also rises up to a point that is too high for the production of membranes.
Figure 2:
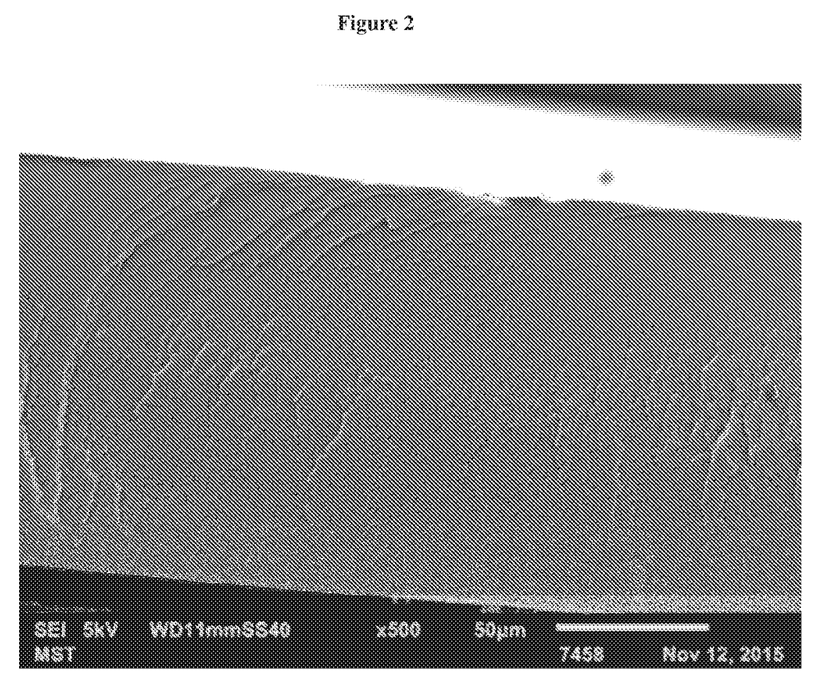
FIG. 2: shows a scanning electron microscope picture of a positively charged membrane according to present invention, which has an asymmetric sponge structure over the entire surface with open pores. On the glass side of the membrane the biggest pores are found (>1000 nm), whilst on the water side the smallest pores are located (<100 nm).

Polymer solutions were prepared by adding the appropriate amounts for 80 g solution of NMP, 2,3,4,5-tetrahydrothiophene-1,1-dioxide, PES and PEI in a 100 ml cup. This blend was then mixed in a dual asymmetric centrifuge (Speedmixer™, FlackTeck Inc.) for 15 to 60 minutes. Typical rotating speeds were 1500 to 2500 rpm. After this mixing, the sample was heated above its critical mixing temperature and a clear viscous solution is obtained and stored overnight at room temperature for degassing. The critical mixing temperature is found to be a function of the NMP/2,3,4,5-tetrahydrothiophene-1,1-dioxide ratio, as presented in FIG. 1.

Polymer films were formed by casting the polymer solution at room temperature on a glass plate with a 0.3 μm casting knife. The thin film was subsequently submerged in water at 20° C. for 5 minutes in order to form the flat sheet membrane. After casting the films are rinsed with water to remove any residual solvents. A JEOL JSM 6010LA Scanning Electron Microscope was used for the initial characterization of the formed membranes.

Figure 3:
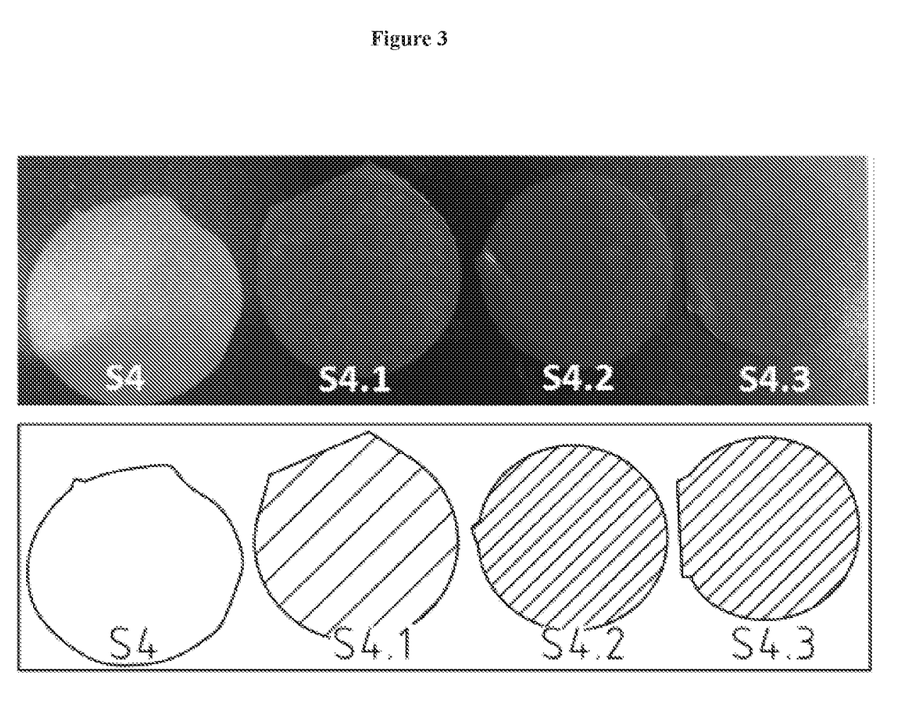
FIG. 3: the positive charge of the membrane was confirmed by staining the membranes with an anionic dye. Positively charged membranes S4.1, 4.2 and 4.3 readily adsorb the red dye when exposed to a solution of this dye (more red, e.g. more shading), whereas membranes made without PEI, S4, do not show any significant adsorption of the dye.
Figure 4:
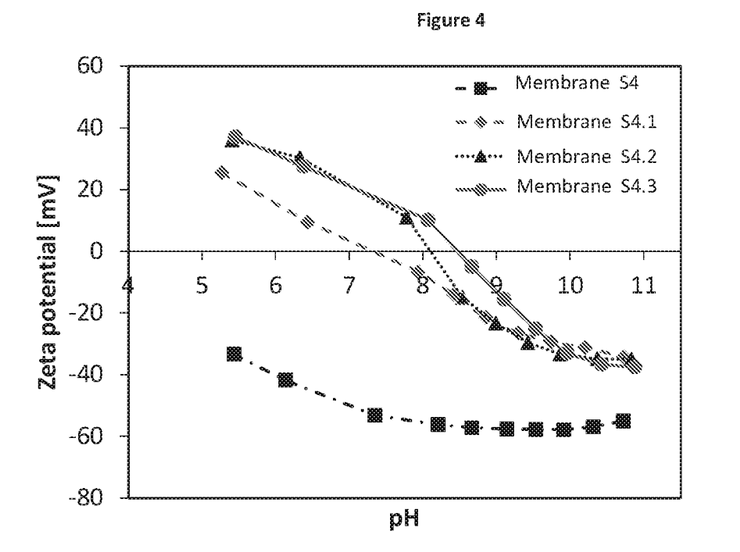
FIG. 4: shows the surface charge measured (Zeta potential) of membranes produced according to the method of present invention (S4 to S4.3) in relation to the pH. The S4 membrane contains no PEI, S4.1, S4.2 and S4.3 have a PEI content of 0.2%, 0.4% and 0.7% respectively. With an increasing PEI content, the membrane becomes positive and the iso-electric point increases.

The positive charge of the membrane was confirmed by staining the membranes with an anionic dye (Ponceau S red), see FIG. 3. Positively charged membranes readily turn red when exposed to a solution of this dye, whereas membranes made without PEI in the dope composition do not show any significant adsorption of the dye. The charge of the membrane is found to be dependent on the amount of PEI added in the dope mixture. For this, the charge of the membranes was determined by zeta-potential measurements. A SurPASS (Anton Paar, Graz Austria) electrokinetic analyser was used to determine the zeta-potential pf the formed membranes at a pH range from 5.5 to 11. The results show that without PEI the membrane is negative over the whole pH range. With an increasing PEI content, the membrane becomes positive and the iso-electric point increases (FIG. 4).

EXAMPLE 2

Producing Flat Sheet Positively Charged Membranes of Present Invention with SPES.

Polymer solutions were prepared in a similar fashion compared to the PES membranes of Example 1. The appropriate amounts for 80 g solution of NMP, 2,3,4,5-tetrahydrothiophene-1,1-dioxide, SPES and PEI were added in a 100 ml cup. This blend was then mixed in a dual asymmetric centrifuge (Speedmixer™, FlackTeck Inc.) for 15 to 60 minutes. Typical rotating speeds were 1500 to 2500 rpm. After this mixing, the sample was heated above its critical mixing temperature and a clear viscous solution is obtained and stored overnight at room temperature for degassing.

Polymer films were formed by casting the polymer solution at room temperature on a glass plate with a 0.3 μm casting knife. The thin film was subsequently submerged in water at 20° C. for 5 minutes in order to form the flat sheet membrane. After casting, the films are rinsed with water to remove any residual solvents. A JEOL JSM 6010LA Scanning Electron Microscope was used for the initial characterization of the formed membranes. Depending on the dope formulation, different membrane structure can be obtained, ranging from finger-like structures to asymmetric sponge-like structures. The positive charge of the as formed membranes was confirmed by staining the membranes with the anionic dye Ponceau S red.

EXAMPLE 3

Producing Hollow Fiber Positively Charged Membranes of Present Invention with PES.

500 g of polymer solution with the appropriate amounts of PES, PEI, NMP and 2,3,4,5-tetrahydrothiophene-1,1-dioxide for 500 g was prepared by mixing the ingredients overnight in a 1000 ml three neck flask. After mixing, the solution was heated above its critical mixing temperature and degassed at room temperature for at least 12 hours. A clear viscous solution is obtained. A bore liquid is prepared by mixing water with NMP or 2,3,4,5-tetrahydrothiophene-1,1-dioxide and degassing the mixture overnight. This polymer solution and bore liquid are passed through a double orifice spinneret at certain flow rates at room temperature. The solutions meet at the end of the spinneret and pass together through the air gap before entering the water coagulation bath. During this process the phase separation occurs both on the bore side as on the outer side of the membrane. The as-spun hollow fibers are then collected, via a rinsing bath, by a pulling wheel. The take-up speed is 10 m/min. The resulting fibers have a permeability of between 50-1000 L/m$^2$hb, depending on the bore liquid composition. The positive charge of the membranes was confirmed by staining the membranes with the anionic dye Ponceau S red. Scanning electron microscope imaging revealed that the membranes show asymmetric sponge-like structures.

The invention claimed is:
1. A method for the production of a positively charged membrane, the method comprising the following steps
   a) mixing at least an aprotic solvent, a polyarylether, 2,3,4,5-tetrahydrothiophene-1,1-dioxide and a polycation, wherein 2,3,4,5-tetrahydrothiophene-1,1-dioxide is present in the homogenous mixture from 50% to 80% and the polycation is present in the homogenous mixture from 0.1% to 10% based on the total weight of the mixture;
   b) heating of the mixture above the critical mixing temperature of the polyarylether to obtain a clear and homogenous mixture;
   c) letting the mixture cool down to below said critical mixing temperature; and
   d) followed by non-solvent induced phase separation resulting in the formation of the positively charged membranes.

2. The method according to claim 1, wherein 2,3,4,5-tetrahydrothiophene-1,1-dioxide is present in the homogenous mixture from 55% to 70% based on the total weight of the mixture.

3. The method according to claim 2, wherein 2,3,4,5-tetrahydrothiophene-1,1-dioxide is present in the homogenous mixture from 60% to 65%, based on the total weight of the mixture.

4. The method according to claim 1, wherein the polyarylether is present in the homogenous mixture from 10% to 30% based on the total weight of the mixture.

5. The method according to claim 1, wherein the polyarylether is polyethersulfone or sulfonated polyethersulfone or a mixture thereof.

6. The method according to claim 1, wherein the aprotic solvent is present in the homogenous mixture from 1% to 50% based on the total weight of the mixture.

7. The method according to claim 6, wherein the aprotic solvent is present in the homogenous mixture from 5% to 30%.

8. The method according to claim 1, wherein the aprotic solvent is selected from the group consisting of N-methyl-2-pyrrolidone, tetrahydrofuran, ethyl acetate, acetone, dimethylformamide, acetonitrile and dimethyl sulfoxide.

9. The method according to claim 1, wherein the polycation is present in the homogeneous mixture from 0.2% to 5% based on the total weight of the mixture.

10. The method according to claim 9, wherein the polycation is present in the homogeneous mixture from 0.3% to 1.8% based on the total weight of the mixture.

11. The method according to claim 1, wherein the polycation comprises amine groups and the polycation is preferably selected from the group consisting of, polyethylenimine, polyallylamine and polydiallyldimethylammonium.

12. A positively charged membrane obtainable by a method according to claim 1, comprising a polyarylether and a polycation, wherein the polyarylether is polyethersulfone or sulfonated polyethersulfone or a mixture thereof and/or wherein the polycation is selected from the group consisting of polyethylenimine, polyallylamine and polydiallyldimethylammonium, wherein the polycation is homogenously distributed in the membrane.

13. The positively charged membrane according to claim 12, wherein the membrane is comprised of at least 0.4% of the polycation, based on the total weight of the membrane.

14. The positively charged membrane according to claim 12, wherein the membrane is comprised of at least 50% of the polyarylether, based on the total weight of the membrane.

15. The positively charged membrane according to claim 12, wherein the polyarylether is polyethersulfone or sulfonated polyethersulfone or a mixture thereof.

16. The positively charged membrane according to claim 12, wherein the polycation is selected from the group consisting of, polyethylenimine, polyallylamine and polydiallyldimethylammonium.

17. The positively charged membrane according to claim 12, wherein the membrane is positively charged at a pH less then pH 10.

18. The positively charged membrane according to claim 12 with a pore size of 10 nm to 80 nm.

19. Use of a positively charged membrane according to claim 12 for decontaminating liquids.

20. Use of a positively charged membrane according to claim 19, wherein decontamination comprises the removal and/or inactivation of microorganisms.

21. A filter device comprising at least one positively charged membrane according to claim 12.

* * * * *